219-121. SR 9-16-75 XR 3,905,096

United States Patent [19]

Tawara et al.

[11] 3,905,096

[45] Sept. 16, 1975

[54] METHOD OF FABRICATING COILS

[75] Inventors: Junro Tawara, Fussa; Masanori Ohhashi, Ichikawa, both of Japan

[73] Assignee: Dai Nippon Printing Co., Ltd., Tokyo, Japan

[22] Filed: Mar. 22, 1974

[21] Appl. No.: 453,687

[30] Foreign Application Priority Data

May 4, 1973 Japan ............ 48-50117

[52] U.S. Cl. ........... 29/605; 29/25.42; 219/121 LM

[51] Int. Cl.² ........... H01F 7/06

[58] Field of Search ........... 29/605, 25.42; 336/206; 117/8; 219/121 LM

[56] References Cited

UNITED STATES PATENTS

| | | | |
|---|---|---|---|
| 2,399,798 | 5/1946 | Grouse | 29/25.42 |
| 2,503,418 | 4/1950 | Scrantom | 117/8 |
| 2,727,297 | 12/1955 | Fralish et al. | 29/25.42 |
| 3,419,706 | 12/1968 | Lohrmann | 219/121 LM |
| 3,477,126 | 11/1969 | Price | 29/25.42 |
| 3,560,904 | 2/1971 | Wilkes | 29/605 |

*Primary Examiner*—Carl E. Hall
*Attorney, Agent, or Firm*—Donald D. Mon; D. Gordon Angus

[57] ABSTRACT

This invention provides a method of fabricating thin plate like coils of high winding density, in which a coil material formed by providing a number of parallel conductors in the form of stripes on an electrical insulating layer is lengthwise cut between the parallel conductors while winding the conductors on winding means.

1 Claim, 6 Drawing Figures

METHOD OF FABRICATING COILS

BACKGROUND OF THE INVENTION

This invention relates to a method of fabricating coils used in electric devices, communication devices and measuring instruments, and more particularly to a method of fabricating a coil in the form of a thin plate (hereinafter referred to as a thin plate like coil, when applicable) employed in the above described electrical equipment.

There have been known several methods of fabricating such thin plate like coils; that is, a method of fabricating a coil by forming a desired coil pattern of etching proof film on a printed circuit substrate of copper plate and subjecting it to chemical etching; a method of fabricating a coil by punching out a coil-shaped conductor and fixing it on a synthetic resin layer; a method of fabricating a coil by coiling a wire in a plane using a jig and by fixing it by adhesives.

However, the method based on the chemical etching accompanies difficulties such as, since a width of a conductor layer to be formed into a coil is decayed or decreased by a side-etching action, it is difficult to make smaller the distance between the adjacent conductors of the coil than 1 to 2.5 times the thickness of the conductor layer, and accordingly the coils fabricated by this method have a winding density less than a certain limited value. In the method of fabricating coils by punching out, it is difficult to fix the coil shaped conductor punched out onto the synthetic resin layer without changing the configuration of the coil. Particularly it is difficult to maintain unchanged the configuration of the coil in which the thickness is thin and the distance between the adjacent coil conductors is relatively small, so that the only coil which has been fabricated by this method is one in which the thickness of its coil conductor is relatively great and the distance between the adjacent coil conductors is relatively great.

Among the above-described conventional methods, the method of coiling a wire may be most preferable. However, in case of the method of coiling a wire employment of the round wire, whose conductor space factor is relatively small, is not preferable in view of the current density. On the other hand, in the case where a square wire is employed as a wire to be coiled, it is difficult to prevent the twisting of the wire which may be caused in coiling the square wire.

Furthermore, the conventional methods described above are not suitable for the production of coils on a large scale.

SUMMARY OF THE INVENTION

Accordingly, it is a primary object of this invention to eliminate all of the difficulties in the conventional fabricating process of coils.

Another object of the invention is to provide a method of fabricating a coil which is in the form of a thin plate and has current capacity as desired.

A further object of the invention is to provide a method of fabricating a coil which will not short-circuit between the adjacent coil conductors of the coil.

The foregoing objects and other objects of this invention have been achieved by provided a method of fabricating coils which comprises the steps of feeding a coil member formed by arranging a number of parallel conductors on an insulating film, cutting lengthwise each of the parts of the insulating film between the adjacent parallel conductors while winding the coil member, and after a desired number of turns of the coil member have been wound, cutting off the coil member.

The nature, utility and principle of the invention will become more apparent from the following detailed description when read in conjunction with the accompanying drawings.

DETAILED DESCRIPTION OF THE INVENTION

Figure 1:
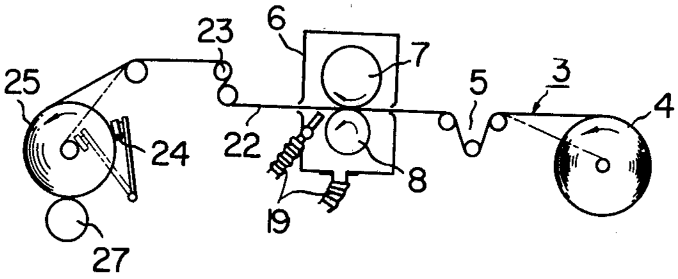
FIG. 1 is a schematic diagram illustrating a device for carrying out a method of fabricating coils according to the invention.
Figure 2:
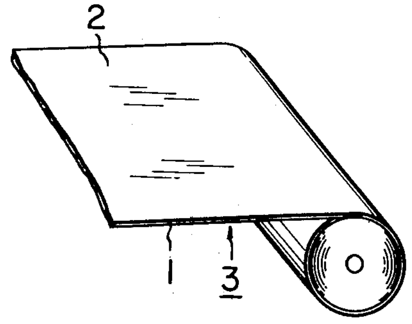
FIG. 2 is a perspective view illustrating a coil material supplying section shown in FIG. 1.

One preferred example of the method of fabricating coils according to this invention will be described with reference to the accompanying drawings. As is shown in FIGS. 1 and 2, a coil material 3 made by affixing a conductor foil 2 onto an insulating film 1 is fed from a coil material supplying section 4 through a tension control section 5. The tension control section 5 operates to give constant tension to the coil material 3 by a well-known method at all times. The coil material, passing through the tension control section 5, is then inserted between the upper cutting member 7 and the lower cutting member 8 in a cutting section 6.

Figure 3:
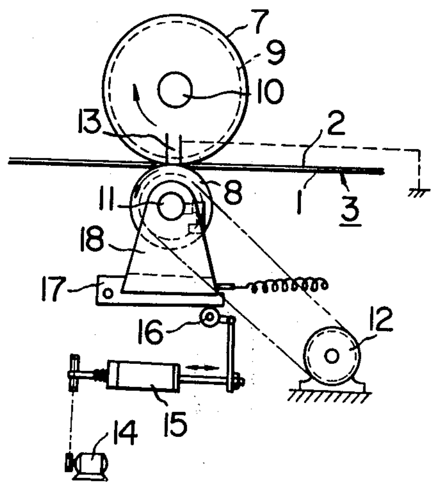
FIG. 3 is a schematic diagram illustrating in detail a cutting section shown in FIG. 1.

The upper-cutting member 7 is provided with a number of cutting rings equally spaced apart from one another, spacer rings 9 inserted between the cutting rings. The spacer ring 9 is slightly smaller in diameter than the cutting ring and is as wide as the thickness of a coil to be fabricated. The upper cutting member 7 is fixedly mounted on the upper shaft 10 as is shown in FIG. 3. The upper shaft 10 is rotated through a rotation transmission mechanism (not shown) such as gears, pulleys and belts, and sprockets and chains, by a driving motor in a coil take-up section so that a peripheral speed of the upper cutting member 7 is the same as a speed of supplying the coil material 3.

The lower cutting member 8 has a periphery in the form of a spiral gear and a width equal to the sum of the widths of the cutting rings and spacer rings 9 of the upper cutting member 7. The lower cutting member 8 is also fixedly mounted on the lower shaft 11. This lower shaft 11 is rotated at a high speed through a rotation transmission mechanism by a lower-cutting-member driving motor 12. As a result, the conductor foil 2 is partly shaven off, or removed off, by the cutting rings of the upper cutting member 7 so as to form the stripes of the conductor foil 2 on the insulating film 1, that is, a part of the conductor foil 2 confronting the spacer rings 9 remains unshaven to form the stripes of the conductor foil 2 on the insulating film 1.

In this operation, the distance between the upper cutting member 7 and the lower cutting member 8 must be maintained equal to the thickness of the insulating film 1 at all times. If the distance between these cutting members 7 and 8 is greater than the thickness of the insulating film 1, the conductor foil to be removed will not be removed. In contrast, if the distance between the cutting members 7 and 8 is smaller than the thickness of the insulating film 1, then the insulating film 1 which should not be removed will be removed.

For this reason, the distance between the upper cutting member 7 and the lower cutting member 8 is detected by a detection section. A detection signal from the detection section operates to maintain the distance constant through a pilot motor 14, a threaded shaft of an air cylinder 15, an eccentric cam shaft 16, a rack 17, a frame 18 of the lower cutting member 8 and the lower shaft 11 at all times. The distance described above is set correct whenever the thickness of the insulating film 1 is varied by, for instance, replacement of a coil material.

The detection section may be such a detector as mechanically, electrically or optically carries out the detection of the distance.

In the detection section of this example, a limiter 13 electrically grounded to the upper shaft 10 is provided as shown in FIG. 3 while a voltage V is applied to the lower shaft 11. The detection signal is produced by detecting the contact conditions between the limiter 13 and the lower cutting member 8. In this operation, when the distance between the upper cutting member 7 and the lower cutting member 8 becomes abnormally small, or smaller than the thickness of the insulating film 1, the upper cutting member 7 is electrically in contact with the lower cutting member 8, as a result of which the limiter 13 operates to stop the operation of the cutting section 6.

The conductor foil removed by the cutting section is discarded through dust suction ducts.

Figure 4:
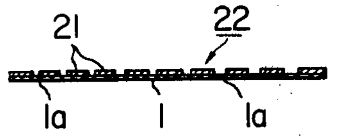
FIG. 4 is a cross-sectional view of a coil member shown in FIG. 1.

A number of parallel conductors 21 in the form of stripes are thus formed on the insulating film 1 as is shown in FIG. 4. The coil material thus treated will hereinafter be referred to as "a coil member 22." This coil member 22 is transferred from the cutting section 6 to guide rollers 23. The coil member 22 guided by the guide rollers 23 is futher transferred to a coil take-up shaft in a coil take-up section 25. When the coil member 23 is wound on one-sixth to five-sixths the surface of the coil take-up shaft, parts 1*a* of the insulation film 1 appearing between the parallel conductors 21 are lengthwise, or longitudinally, cut by a cutter 24 of blade while winding of the coil member 22 thus cut is continued. After a required number of turns of the coil member 22 have been wound on the coil take-up shaft of the coil take-up section 25, the coil member 22 is cut off the coil take-up shaft by a cutter (not shown). In FIG. 1, reference numeral 27 represents a surface driving roller which also operates to abut against the surface of the coil member 22 wound on the coil take-up shaft.

Figure 6:
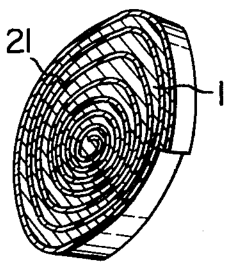
FIG. 6 is a perspective view showing a coil fabricated, according to this invention, in the form of a thin plate.

A coil in the form of a piece of thin plate is shown in FIG. 6.

In this invention, a coil material formed by providing a pressure-sensitive adhesive layer on one side of the insulating film 1 and the conductor foil 2 on the other side or a coil material formed by providing an insulating layer and an adhesive layer on the one side mentioned above may be employed. The coil member may be wound on while an insulating adhesive being applied to the insulating film 1. Furthermore, a coil material formed by providing an insulating adhesive layer on the conductor foil 2 may be used in this invention.

Figure 5:
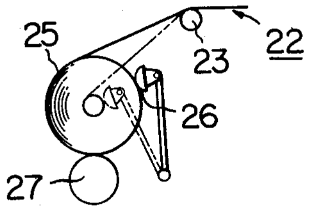
FIG. 5 is also a schematic diagram illustrating an electric heater for longitudinally cutting an insulating film shown in FIG. 1.

In the case where a heat adhesive insulating film is such as polyethylene, provision of a heating device in the vicinity of the coil take-up section 25 can eliminate the employment of adhesives. In place of the cutter 24, an electrical heater 26 or laser ray can be used for cutting the insulating film 1 as shown in FIG. 5.

In the invention, in addition, a coil member which is made by providing a number of parallel conductors in the form of stripes on the insulating film 1 by a photoetching method may be used. Furthermore, a coil member which is made by arranging a number of conductor foils like wires on the insulating film 1 by applying adhesives or by welding with heat may be used. In these cases, the cutting section 6 can be eliminated.

The specific features of this invention resides in that a coil member formed by providing a number of parallel conductors on an insulating film is fed to a cutting section, parts of the insulating film appearing between the parallel conductors are lengthwise by the cutting section while the coil member being wound on a coil take-up shaft, and after a necessary number of turns of the coil member have been wound thereon, the coil member is cut off the coil take-up shaft. That is, the invention aims at a method of fabricating coils as described above and is not limited by construction of the parts for practising the method.

As is apparent from the above description, this invention provides a method of fabricating a coil in the form of a thin plate whose winding density is much greater than that of a conventional coil in the form of a thin plate. Furthermore, since a cross-sectional area of the parallel conductor 21 can be arbitrarily varied by changing a difference in diameter between the cutting ring and the spacer ring 9 of the coil cutting member 7 or by changing a width of the spacer ring 9 or by changing an etching width, the invention can provide a thin plate shaped coil having a desired current capacity and readily fabricate a number of such coils at one time.

In this invention, since the insulating film parts appearing between the parallel conductors is lengthwise cut, no short-circuit between the adjacent parallel conductors due to burrs caused by cutting will occur. Accordingly, etching or polishing the cut surfaces of the coil member is not necessary at all.

What is claimed:

1. The method of fabricating coils which comprises the steps of:

a. making a coil material by affixing a conductor foil on an insulating film;

b. inserting the coil material between an upper cutting member and a lower cutting member of a cutting section, in which the upper cutting member is provided with a plurality of cutting rings spaced apart from each other and provided with spacer rings therebetween, each of the spacer rings having a slightly smaller diameter than that of the cutting rings and a width equal to the thickness of a coil to be fabricated, and the lower cutting member is fixedly mounted on a lower shaft and has a periphery in the form of a spiral gear and a width equal to the sum of the widths of the cutting rings and the spacer rings of the upper cutting member;

c. rotating the lower shaft by a driving motor;

d. maintaining the distance between the upper cutting member and the lower cutting member equal to the thickness of the insulating film during rotation of the lower shaft;

e. shaving off longitudinally the conductor foil by action of the cutting rings, thereby forming a plurality of parallel conductors on said insulating film;

f. cutting the insulating film between the adjacent parallel conductors while winding the coil material into a coil; and g. cutting the coil material transversely after a desired number of turns of the coil material have been wound on the coil.

* * * * *